United States Patent
Harada

[11] 3,814,505
[45] June 4, 1974

[54] EQUI-MAGNIFICATION COPYING LENS

[75] Inventor: Kenichi Harada, Tokyo, Japan

[73] Assignee: Olympus Optical Co., Ltd., Tokyo-to, Japan

[22] Filed: Sept. 7, 1972

[21] Appl. No.: 286,947

[30] Foreign Application Priority Data
Sept. 8, 1971    Japan................................ 46-68855

[52] U.S. Cl................................. 350/214, 350/207
[51] Int. Cl............................................. G02b 9/64
[58] Field of Search.................................... 350/214

[56] References Cited
UNITED STATES PATENTS
3,614,208    10/1971    Matsumoto et al................. 350/214
3,685,884    8/1972    Harada.............................. 350/214

*Primary Examiner*—John K. Corbin
*Attorney, Agent, or Firm*—Cushman, Darby & Cushman

[57] ABSTRACT

An equi-magnification lens system for copying is described. To obtain an equi-magnification lens, which can cover a wide effective field and is compact, and whose various aberrations are sufficiently corrected, according to the present invention there is provided a perfectly symmetric optical system consisting of two lens groups symmetric with respect to a stop. Each lens group consists of seven lenses successively arranged from the stop. The first lens nearest to the stop is a negative meniscus lens with the convex surface directed toward the stop. The second lens is a positive lens with its convex surface of a small radius of curvature directed toward the stop. The third lens is a negative meniscus lens with its convex surface directed toward the stop. The fourth lens is a negative meniscus lens with its concave surface directed toward the stop. The fifth lens is a positive lens with its convex surface of a small radius of curvature directed away from toward the stop. The sixth and seventh lenses are both positive lenses.

5 Claims, 13 Drawing Figures

EQUI-MAGNIFICATION COPYING LENS

BACKGROUND OF THE INVENTION

1. Field of the Invention:

The present invention concerns equi-magnification lenses and, more particularly, it relates to wide field, high resolution copying equi-magnification lenses.

2. Description of the Prior Art:

There are many fields where very fine patterns are precisely copied from originals by the contact copying or contact print method. A typical example of such fields is that of the manufacture of semiconductor integrated circuits, as is well known in the art. As other examples, such fields as manufacture of eye-pieces provided with graduations to measure lengths, production of diffraction gratings for moire-fringes, copying of microfilms and production of lens test charts can be considered. The well-known contact copying method for copying fine patterns, however, has a drawback in that the original is subjected to serious wear. Also, the resolution is extremely deteriorated with an inferior contact state.

To overcome the above drawbacks inherent in the contact copying method, what may be called an equi-magnification copying method has been contemplated and extensively tested in many fields, particularly in the field of manufacturing semiconductor integrated circuits. Several kinds of equi-magnification lenses for use in this method have already been proposed. The effective field size of these lenses mostly ranges between 30 and 50 mm in diameter.

However, when the equi-magnification copying lens is used in the manufacture of semiconductor integrated circuits, precision copying of the original is important. Therefore, the equi-magnification copying lens should be provided uniform resolution over the entire area of the original. Furthermore, other several conditions are imposed upon the lens, for instance, the magnification should be precise within a tolerance of 1 to 2 microns for a peripheral portion of the field. Also, in lenses which have the astigmatism or coma, the resolution is extremely degraded for peripheral portions of the field. Further, it is of course undesired if there is a difference between meridional resolution and sagittal resolution. Furthermore, if there is a curvature of field, with the focus set at a certain spot of the original picture the rest of the picture will be out of focus, so that it is impossible to obtain uniform resolution over the entire picture field. Thus, the correction of this aberration is very important. Moreover, since severe condition is imposed upon the precision of the magnification as mentioned earlier, the correction of the distortion is also very important. Generally, the correction of the above various aberration is the more difficult the greater the field size is.

As one type of the equi-magnification lenses, there are optical systems which are perfectly symmetric with respect to a stop and the present invention pertains to this type of lens. The perfect symmetric optical system is advantageous in that when focusing an image at an equal magnification, both distortion and chromatic aberration of magnification are completely corrected. Also, meridional and sagittal longitudinal aberration can be corrected comparatively easily. With this system, however, the correction of spherical aberration, astigmatism and offaxial sagittal longitudinal aberration is extremely difficult. The difficulty of correction of these aberrations is particularly pronounced for peripheral portions of the field. Under the condition that the lens has to be compact, it is an extreme difficulty to sufficiently correct the above aberrations over the entire picture field. One of the reasons for this resides in that the magnitude of the spherical aberration, astigmatism and offaxial sagittal longitudinal aberration that result when an image of an object placed at an infinitely remote position is picked up by a lens group behind the stop is just doubled when the image is focused with the perfectly symmetric optical system at exactly the same magnification.

SUMMARY OF THE INVENTION

An object of the present invention is to provide an equi-magnification copying lens, which can overcome the afore-mentioned difficulties and has a relatively compact construction, and whose sharpness of the image is uniform over the entire field even if the field is as wide as 76 to 80 mm in diameter.

According to the present invention, there is provided a perfectly symmetric optical system with respect to a stop, that is, having two lens groups which are symmetric with respect to a stop. Each of the lens groups consists of seven lenses. The lenses of, for instance, the lens group on the image side of the stop, will be hereinafter referred to respectively as first to seventh lenses, the first lens 1 being nearest to the stop. The first lens 1 is a negative meniscus lens with the convex surface directed toward the stop. The second lens 2 is a positive lens with its convex surface of a small radius of curvature directed toward the stop. The third lens 3 is a negative meniscus lens with its convex surface directed toward the stop. The fourth lens 4 is a negative meniscus lens with its concave surface directed toward the stop. The fifth lens 5 is a positive lens with its convex surface of a small radius of curvature directed toward an image side. The sixth and seventh lenses 6, 7 are both positive lenses.

Further, the lens system according to the present invention satisfies the following conditions:

$$0.25f < r_2 < r_1 < 0.41f \tag{1}$$

$$0.08f < d_7 + d_8 + d_9 < 0.21f \tag{2}$$

$$2.8 < f_{123}/f < 4.3 \tag{3}$$

$$0.5 < f_{4567}/f < 1.8 \tag{4}$$

$$-0.35f < r_7 < -0.1f \tag{5}$$

In the above inequalities, reference should be had to that $f$ represents the total focal length, $f_{123}$ represents the focal length from the first lens 1 to the third lens 3, $f_{4567}$ represents the focal length from the fourth lens 4 to the seventh lens 7, $r_1, r_2, \ldots, r_{14}$ represent respective radii of curvature of the successive lens surface, with the subscript representing the order of occurrence of the surfaces from the stop, and $d_1, d_2, \ldots, d_{13}$ represents the axial thicknesses and the axial spaces of successive lenses.

Generally, an optical arrangement where the surfaces $r_1$ and $r_2$ of the first lens 1 is concave with respect to the stop is desirable from the standpoint of the correction of the astigmatism. According to the present invention, they are convex with respect to the stop since $r_1 > 0$ and $r_2 > 0$ as is apparent from condition 1. This condition 1 is not desired, but priority is given to the correction of spherical aberration and offaxial sagittal longitudinal aberration, and the additional condition 2 is provided. With condition 1, with which $r_2$ and $r_1$ are limited between $0.25f$ and $0.41f$ while maintaining the relation $r_2 < r_1$, the spherical aberration can be sufficiently corrected. With this correction, the offaxial sagittal longitudinal aberration is excessively compensated for peripheral zone of the field. This excessively compensated offaxial sagittal aberration for the edge of the field can be corrected by condition 2. More particularly, from the fact that the compensation of the offaxial sagittal longitudinal aberration becomes insufficient as $d_7 + d_8 + d_9$ is increased above $0.08f$, the excessively compensated spherical sagittal longitudinal aberration under condition 1 is canceled, so that satisfactory balance may be obtained. However, when $d_7 + d_8 + d_9$ exceeds the upper limit of $0.21f$, the offaxial sagittal longitudinal aberration becomes extremely severe, so that it can no longer be compensated by condition 1. Thus, it is necessary to make $0.21f$ the upper limit of condition 2.

As mentioned earlier, having $r_1 > 0$ and $r_2 > 0$ as in condition 1 is not desired in view of the effects upon the astigmatism. However, by setting $f = 236$ mm and $Y = 38$ mm (Y being the image height), the half angle $\omega$ of field can be held comparatively small, being about 9°. Also, by having the ratio of the total focal length $f$ to the focal length $f_{123}$ from the first to the third lenses greater than 2.8, the power of the light passing through the center of the stop, that is, of the principal ray, is weak enough to withhold any increase of astigmatism in this lens group. By doing so, the undesired effects upon the astigmatism due to condition 1 including $r_1 > 0$ and $r_2 > 0$ can be minimized. Meanwhile, with increase in $f_{123}/f$ the distance to the final lens surface $r_{14}$ from the focal plane is increased, which goes against to the end of rendering the lens system compact. Thus, it is necessary to provide the upper limit of 4.3 for $f_{123}/f$ as in condition 3.

Condition 4 is provided to give priority to the compactness of the lens arrangement and correction of the astigmatism, particularly the curvature of field in a sagittal plane. By having $f_{4567}/f$ smaller than 1.8, the distance to the final lens surface $r_{14}$ from the focal plane is small enough to obtain sufficiently compact lens arrangement and sufficiently correct the curvature of field in a sagittal plane. However as the $f_{4567}/f$ is reduced from 1.8, the compensation of the curvature of field in a meridonal plane becomes progressively insufficient. Accordingly, the curvature of field in a meridional plane is corrected by the provision of condition 5, that is, by having $r_7$ smaller than $-0.1f$. Fortunately, the change in $r_7$ upon the curvature of field in a sagittal plane has an extremely small effect compared with its effect upon the curvature of field in a meridional plane. Thus, cndition 5 has small effect upon the sufficiently corrected curvature of field in a sagittal plane under condition 4. However, when $r_7$ is smaller than $-0.35f$, the curvature of field in a sagittal plane is too pronounced to be corrected by condition 4. The lower limit of 0.5 in condition 4 is provided so that the curvature of field in a meridional plane can be sufficiently corrected by condition 5.

In order to obtain further compact lens arrangement and still better correction of the curvature of field in sagittal and meridional planes, the above conditions 4 and 5 may be further limited to:

$$0.8 < f_{4567}/f < 1.2 \tag{4'}$$

$$-0.27f < r_7 < -0.15f \tag{5'}$$

Also, by having $r_6 > 0.2f$, it is possible to obtain still better correction of the curvature of field in a meridional plane under the broad range conditions 4 and 5. Further, by having $d_6 < 0.1f$ it is possible to achieve the compact lens arrangement more effectively under the broad range condition 4.

DESCRIPTION OF THE PREFERRED EMBODIMENTS

Figure 1:
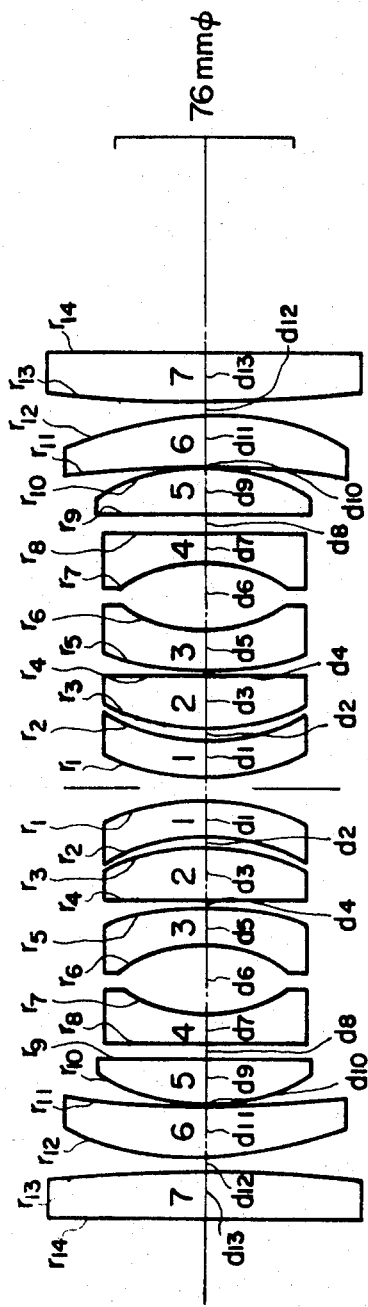
FIG. 1 is a sectional view showing the lens arrangement in the first embodiment of the equi-magnification lens system according to the present invention.

Referring to FIG. 1, there is shown the lens arrangement of the first embodiment of the equi-magnification lens system according to the present invention.

The constructional data related to four embodiments according to the present invention are shown as follow:

TABLE I $S_1 = 5.34$

| | | | | | | |
|---|---|---|---|---|---|---|
| $r_1$ | 88.806 | $d_1$ | 11.78 | | | |
| $r_2$ | 70.027 | $d_2$ | 3.76 $n_1$ | 1.67321 | $v_1$ | 38.25 |
| $r_3$ | 87.545 | $d_3$ | 18.07 | | | |
| $r_4$ | ∞ | $d_4$ | 2.47 $n_2$ | 1.69312 | $v_2$ | 55.33 |
| $r_5$ | 154.095 | $d_5$ | 14.07 | | | |
| $r_6$ | 60.898 | $d_6$ | 21.79 $n_3$ | 1.64058 | $v_3$ | 46.93 |
| $r_7$ | −52.226 | $d_7$ | 10.58 | | | |
| $r_8$ | 2274.1 | $d_8$ | 5.01 $n_4$ | 1.6596 | $v_4$ | 35.37 |
| $r_9$ | 703.982 | $d_9$ | 18.71 | | | |
| $r_{10}$ | −77.022 | $d_{10}$ | 0.14 $n_5$ | 1.62799 | $v_5$ | 56.36 |
| $r_{11}$ | −539.635 | $d_{11}$ | 18.21 | | | |
| $r_{12}$ | −129.486 | $d_{12}$ | 5.0 $n_6$ | 1.62731 | $v_6$ | 54.95 |
| $r_{13}$ | −807.087 | $d_{13}$ | 16.65 | | | |
| $r_{14}$ | ∞ | | $n_7$ | 1.62731 | $v_7$ | 56.36 |

$f = 236.046$
(1) $r_1 = 0.376f$, $r_2 = 0.297f$
(2) $d_7 + d_8 + d_9 = 0.145f$
(3) $f_{123}/f = 3.172$
(4) $f_{4567}/f = 0.957$
(5) $r_7 = -0.221f$
(6) $r_6 = 0.258f$

TABLE II $S_1 = 5.27$

| | | | | | | |
|---|---|---|---|---|---|---|
| $r_1$ | 89.288 | $d_1$ | 11.82 $n_1$ | 1.67321 | $v_1$ | 38.25 |
| $r_2$ | 70.202 | $d_2$ | 3.76 | | | |
| $r_3$ | 87.951 | $d_3$ | 18.18 $n_2$ | 1.69312 | $v_2$ | 55.33 |
| $r_4$ | ∞ | $d_4$ | 2.64 | | | |
| $r_5$ | 155.575 | $d_5$ | 14.19 $n_3$ | 1.64058 | $v_3$ | 46.93 |
| $r_6$ | 61.19 | $d_6$ | 21.8 | | | |
| $r_7$ | −52.109 | $d_7$ | 10.39 $n_4$ | 1.6596 | $v_4$ | 35.37 |
| $r_8$ | 2814.075 | $d_8$ | 5.19 | | | |
| $r_9$ | 745.881 | $d_9$ | 18.23 $n_5$ | 1.62731 | $v_5$ | 56.36 |

| | | | | | | |
|---|---|---|---|---|---|---|
| $r_{10}$ | −76.778 | $d_{10}$ | 0.14 | | | |
| $r_{11}$ | −528.197 | $d_{11}$ | 18.14 | $n_6$ | 1.62799 | $v_6$ 54.95 |
| $r_{12}$ | −127.861 | $d_{12}$ | 5.01 | | | |
| $r_{13}$ | 799.931 | $d_{13}$ | 16.64 | $n_7$ | 1.62731 | $v_7$ 56.36 |
| $r_{14}$ | ∞ | | | | | |

$f = 236.081$ (1) $r_1 = 0.378f$, $r_2 = 0.297f$
(2) $d_7 + d_8 + d_9 = 0.143f$
(3) $f_{123}/f = 3.282$
(4) $f_{4567}/f = 0.950$
(5) $r_7 = -0.221f$
(6) $r_6 = 0.259f$

TABLE III $S_1 = 5.25$

| | | | | | | |
|---|---|---|---|---|---|---|
| $r_1$ | 89.741 | $d_1$ 11.84 | $n_1$ | 1.67321 | $v_1$ | 38.25 |
| $r_2$ | 70.363 | $d_2$ 3.75 | | | | |
| $r_3$ | 88.288 | $d_3$ 18.26 | $n_2$ | 1.69312 | $v_2$ | 55.33 |
| $r_4$ | ∞ | $d_4$ 2.73 | | | | |
| $r_5$ | 156.598 | $d_5$ 14.19 | $n_3$ | 1.64058 | $v_3$ | 46.93 |
| $r_6$ | 61.507 | $d_6$ 21.74 | | | | |
| $r_7$ | −51.959 | $d_7$ 10.09 | $n_4$ | 1.6596 | $v_4$ | 35.37 |
| $r_8$ | 3422.314 | $d_8$ 5.26 | | | | |
| $r_9$ | 779.819 | $d_9$ 17.89 | $n_5$ | 1.62731 | $v_5$ | 56.36 |
| $r_{10}$ | −76.497 | $d_{10}$ 0.14 | | | | |
| $r_{11}$ | −507.938 | $d_{11}$ 18.11 | $n_6$ | 1.63695 | $v_6$ | 53.2 |
| $r_{12}$ | −126.679 | $d_{12}$ 5.03 | | | | |
| $r_{13}$ | 812.955 | $d_{13}$ 16.63 | $n_7$ | 1.62731 | $v_7$ | 56.36 |
| $r_{14}$ | ∞ | | | | | |

$f = 235.921$ (1) $r_1 = 0.380f$, $r_2 = 0.298f$
(2) $d_7 + d_8 + d_9 = 0.141f$
(3) $f_{123}/f = 3.371$
(4) $f_{4567}/f = 0.946$
(5) $r_7 = -0.220f$
(6) $r_6 = 0.261f$

TABLE IV $S_1 = 5.21$

| | | | | | | |
|---|---|---|---|---|---|---|
| $r_1$ | 90.351 | $d_1$ 12.49 | $n_1$ | 1.67321 | $v_1$ | 38.25 |
| $r_2$ | 70.007 | $d_2$ 3.75 | | | | |
| $r_3$ | 89.237 | $d_3$ 18.87 | $n_2$ | 1.69312 | $v_2$ | 55.33 |
| $r_4$ | ∞ | $d_4$ 3.41 | | | | |
| $r_5$ | 159.88 | $d_5$ 14.88 | $n_3$ | 1.64058 | $v_3$ | 46.93 |
| $r_6$ | 61.998 | $d_6$ 22.38 | | | | |
| $r_7$ | −51.412 | $d_7$ 9.4 | $n_4$ | 1.6596 | $v_4$ | 35.37 |
| $r_8$ | ∞ | $d_8$ 5.4 | | | | |
| $r_9$ | 918.473 | $d_9$ 17.2 | $n_5$ | 1.62731 | $v_5$ | 56.36 |
| $r_{10}$ | −74.405 | $d_{10}$ 0.41 | | | | |
| $r_{11}$ | −464.138 | $d_{11}$ 18.06 | $n_6$ | 1.63147 | $v_6$ | 54.0 |
| $r_{12}$ | −125.008 | $d_{12}$ 5.42 | | | | |
| $r_{13}$ | 733.772 | $d_{13}$ 16.93 | $n_7$ | 1.62731 | $v_7$ | 56.36 |
| $r_{14}$ | ∞ | | | | | |

$f = 236.242$ (1) $r_1 = 0.382f$, $r_2 = 0.296f$
(2) $d_7 + d_8 + d_9 = 0.135f$
(3) $f_{123}/f = 3.733$
(4) $f_{4567}/f = 0.919$
(5) $r_7 = -0.218f$
(6) $r_6 = 0.262f$

In the above embodiments, $S_1$ represents the distance to the surface of the first lens 1 directed toward the stop therefrom, $r_1$, $r_2$, —, $r_{14}$ represents the radii of curvature of the successive lens surfaces, $d_1$, $d_2$, —, $d_{13}$ represents the axial thickness and the axial spaces of successive lenses, $n_1$, $n_2$, —, $n_7$ represents the refractive indexes of the individual lenses based upon g-line (435.8μ), $v_1$, $v_2$, —, $v_7$ represents the Abbe number of individual lenses, represents the total focal length, $f_{123}$ represents the focal length from the first lens 1 to the third lens 3, and $f_{4567}$ represents the focal length from the fourth lens 4 to seventh lens 7.

Figure 2B:
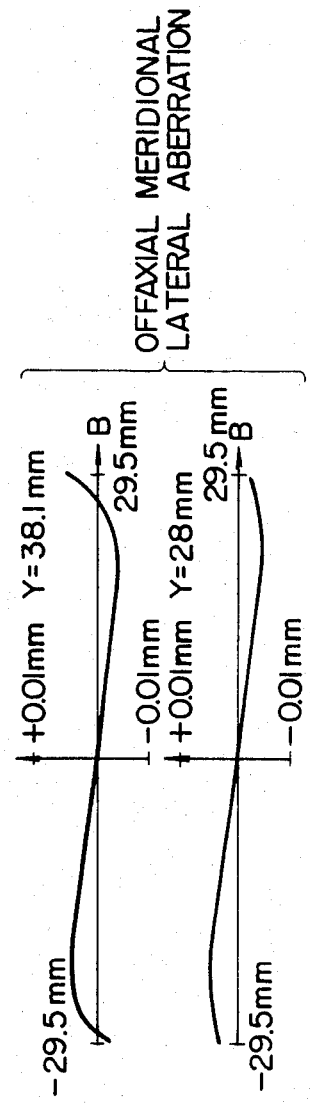
FIGS. 2a, 2b, 2c; 3a, 3b, 3c; 4a, 4b, 4c; and 5a 5b, 5c show various aberration curves for the first to the fourth embodiments of the equi-magnification lens system according to the present invention.
Figure 2A:
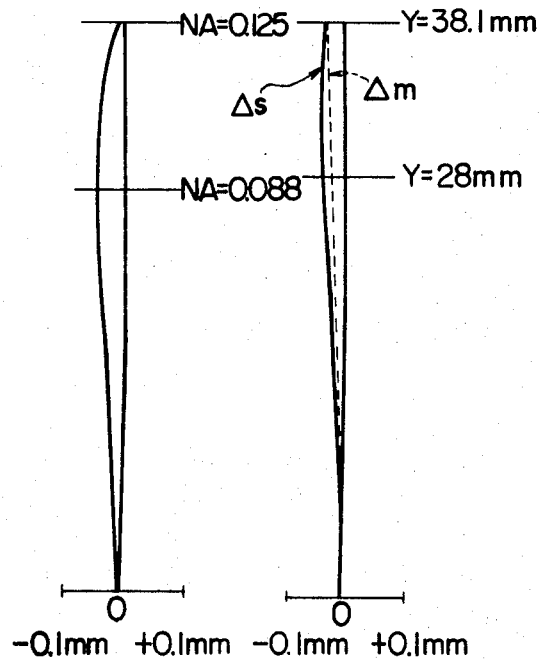
Figure 2C:
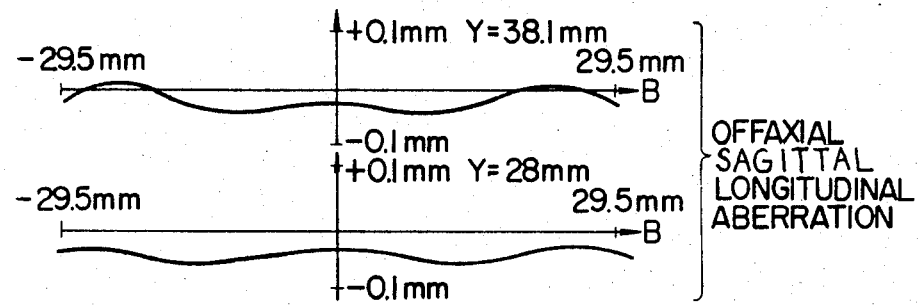
Figure 3A:
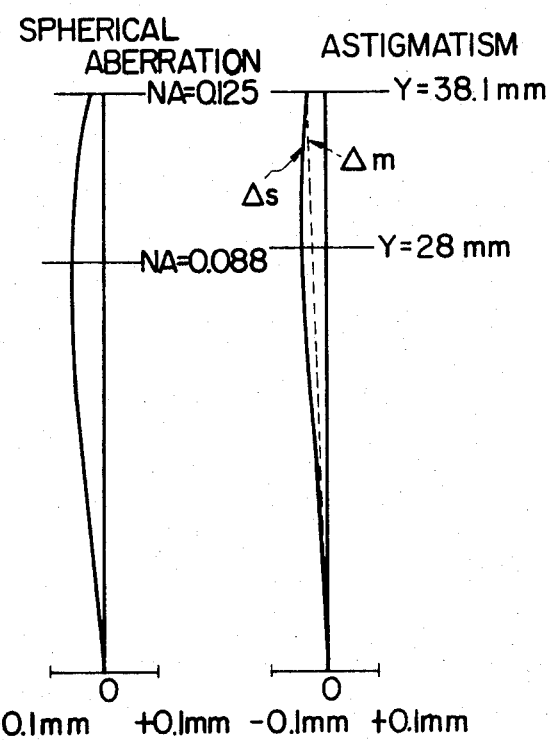
Figure 3B:
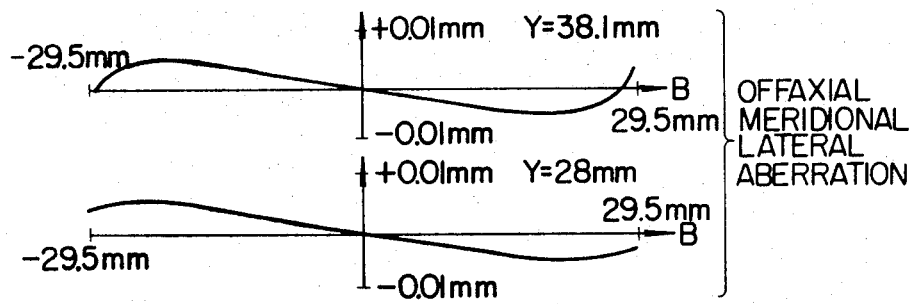
Figure 3C:
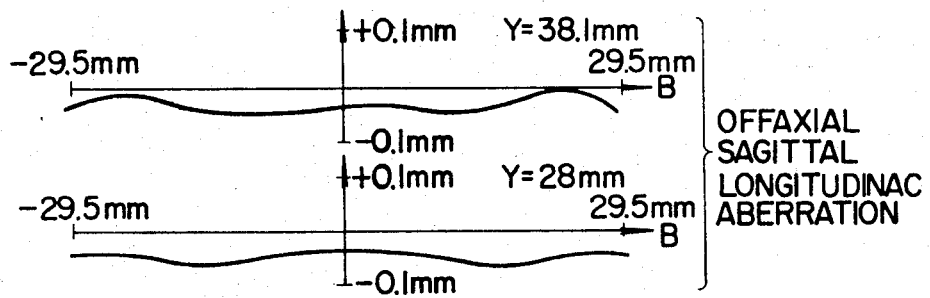
Figure 4A:
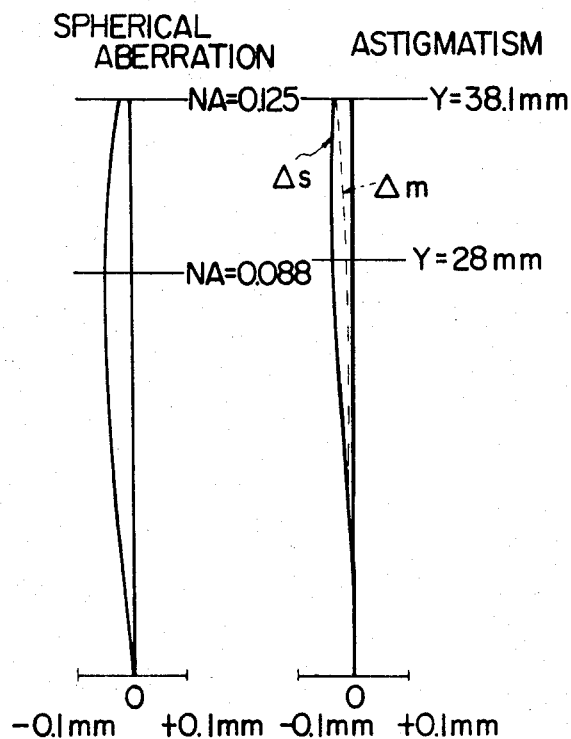
Figure 4B:
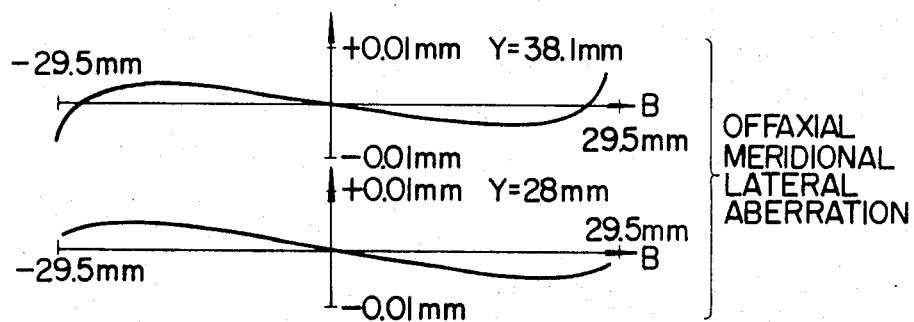
Figure 4C:
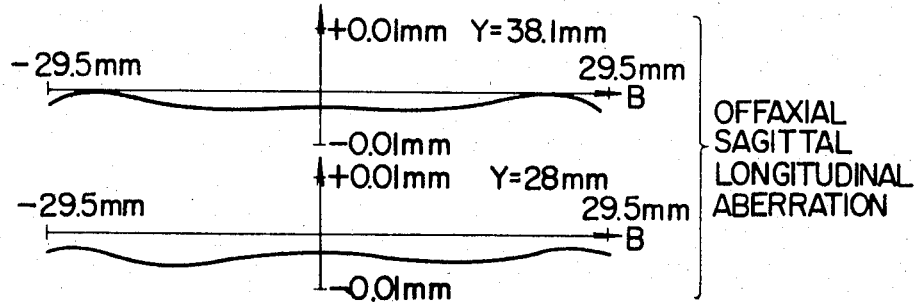
Figure 5A:
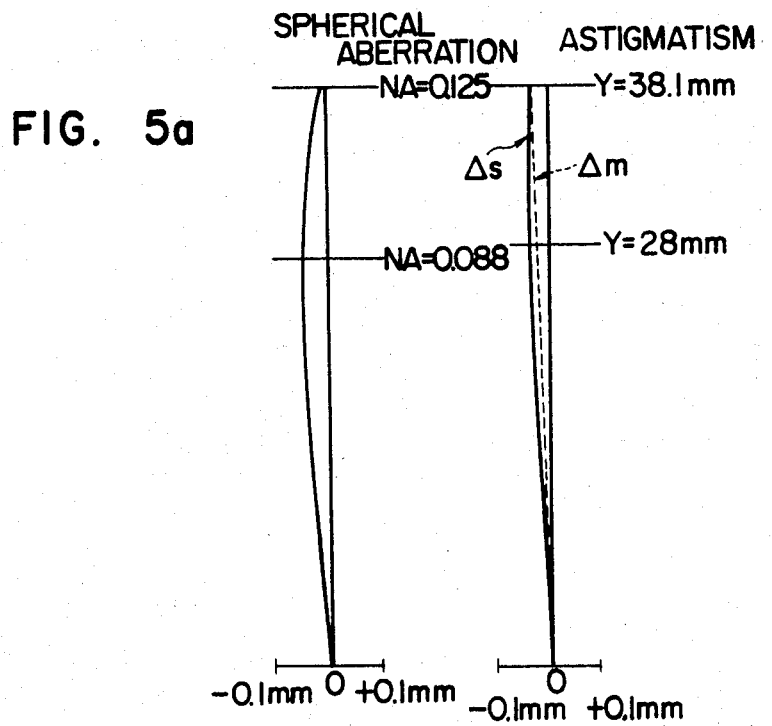
Figure 5B:
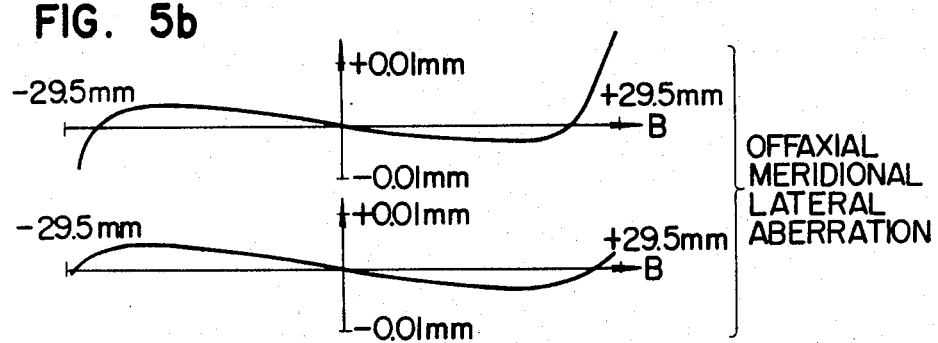
Figure 5C:
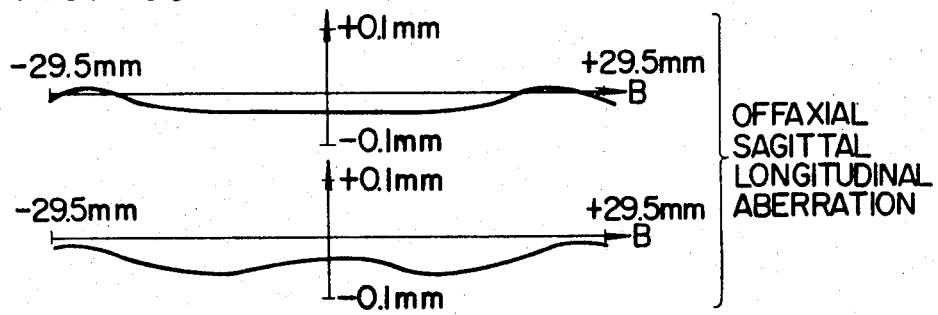

Referring to FIGS. 2a, 2b, 2c; 3a, 3b, 3c; 4a, 4b, 4c; and 5a, 5b, 5c, there are shown various aberration curves corresponding to the above each embodiments 1; 2; 3; and 4, respectively, in the present invention. The aberration curves were obtained with magnification = −1 x, and with numeral aperture N.A. = 0.125 (with effective relative aperture being 1 : 4). Y indicates the image height (in mm), and B indicates a quantity corresponding to the height at which the offaxial rays cut the stop plane.

It will be seen from the above embodiments that the equi-magnification lens system according to the present invention is compact in construction, and can excellently correct various aberrations such as spherical aberration, astigmatism, offaxial meridional lateral aberration and offaxial sagittal longitudinal aberration, and its focusing characteristic is uniform over the entire field up to a reasonable large field diameter.

I claim:

1. An equi-magnification lens perfectly symmetric with respect to a stop, having two lens groups, each of the lens groups consisting of a first lens, a second lens, a third lens, a fourth lens, a fifth lens, a sixth lens and a seventh lens, said first lens being a negative meniscus lens with the convex surface directed toward said stop, said second lens being a positive lens with its convex surface of a small radius of curvature directed toward the stop, said third lens being a negative meniscus lens with its convex surface directed toward said stop, said fourth lens being a negative meniscus lens with its concave surface directed toward said stop, said fifth lens being a positive lens with its convex surface of a small radius of curvature directed away from the stop, said sixth and seventh lenses being both positive lenses, and the lens system satisfying the following conditions:

$$0.25f < r_2 < r_1 < 0.41f \quad (1)$$

$$0.08f < d_7 + d_8 + d_9 < 0.21f \quad (2)$$

$$2.8 < f_{123}/f < 4.3 \quad (3)$$

$$0.5 < f_{4567}/f < 1.8 \quad (4)$$

$$-0.35f < r_7 < -0.1f \quad (5)$$

wherein $f$ represents the total focal length, $r_{123}$ represents the focal length from the first lens to the third lens, $f_{4567}$ represents the focal length from the fourth lens to the seventh lens, $r_1$, $r_2$, —, $r_{14}$ represents respective radii of curvature of the successive lens surfaces, with the subscript representing the order of occurrence of the surface from the stop, and $d_1$, $d_2$, —, $d_{13}$ represents the axial thickness and the axial spaces of successive lenses, respectively.

2. An equi-magnification lens perfectly symmetric with respect to a stop, having two lens groups, each of the lens groups consisting of a first lens, a second lens, a third lens, a forth lens, a fifth lens, a sixth lens and a seventh lens, said first lens being a negative meniscus lens with the convex surface directed toward said stop, said second lens being a positive lens with its convex surface of a small radius of curvature directed toward the stop, said third lens being a negative meniscus lens with its convex surface directed toward said stop, said fourth lens being a negative meniscus lens with its concave surface directed toward said stop, said fifth lens being a positive lens with its convex surface of a small radius of curvature directed away from the stop, said sixth and seventh lenses being both positive lenses, and the lens system having the following numerical data:

TABLE $S_1 = 5.34$

| | | | | | | |
|---|---|---|---|---|---|---|
| $r_1$ | 88.806 | $d_1$ 11.78 | | | | |
| $r_2$ | 70.027 | $d_2$ 3.76 | $n_1$ | 1.67321 | $v_1$ | 38.25 |
| $r_3$ | 87.545 | $d_3$ 18.07 | | | | |
| $r_4$ | ∞ | $d_4$ 2.47 | $n_2$ | 1.69312 | $v_2$ | 55.33 |
| $r_5$ | 154.095 | $d_5$ 14.07 | | | | |

| | | | | | | |
|---|---|---|---|---|---|---|
| $r_6$ | 60.898 | $d_6$ 21.79 | $n_3$ | 1.64058 | $v_3$ | 46.93 |
| $r_7$ | −52.226 | $d_7$ 10.58 | | | | |
| $r_8$ | 2274.1 | $d_8$ 5.01 | $n_4$ | 1.6596 | $v_4$ | 35.37 |
| $r_9$ | 703.982 | $d_9$ 18.71 | | | | |
| $r_{10}$ | −77.022 | $d_{10}$ 0.14 | $n_5$ | 1.62799 | $v_5$ | 56.36 |
| $r_{11}$ | −539.635 | $d_{11}$ 18.21 | | | | |
| $r_{12}$ | −129.486 | $d_{12}$ 5.0 | $n_6$ | 1.62731 | $v_6$ | 54.95 |
| $r_{13}$ | −807.087 | $d_{13}$ 16.65 | | | | |
| $r_{14}$ | ∞ | | $n_7$ | 1.62731 | $v_7$ | 56.36 |

$f = 236.046$ wherein $S_1$ represents the distance to the surface of the first lens 1 directed toward the stop therefrom, $r_1$, $r_2$, —, $r_{14}$ represents the radii of curvature of the successive lens surfaces, $d_1$, $d_2$, —, $d_{13}$ represents the axial thicknesses and the axial spaces of successive lenses, $n_1$, $n_2$, —, $n_7$ represents the refractive indexes of the individual lenses based upon g-line (435.8m $\mu$), $v_1$, $v_2$, —, $v_7$ represents the Abbe number of individual lenses, f represents the total focal length.

3. An equi-magnification lens perfectly symmeric with respect to a stop, having two lens groups, each of the lens groups consisting of a first lens, a second lens, a third lens, a fourth lens, a fifth lens, a sixth lens and a seventh lens, said first lens being a negative meniscus lens with the convex surface directed toward said stop, said second lens being a positive lens with its convex surface of a small radius of curvature directed toward the stop, said third lens being a negative meniscus lens with its convex surface directed toward said stop, said fourth lens being a negative meniscus lens with its concave surface directed toward said stop, said fifth lens being a positive lens with its convex surface of a small radius of curvature directed away from the stop, said sixth and seventh lenses being both positive lenses, and the lens system having the following numerical data:

TABLE $S = 5.27$

| | | | | | | |
|---|---|---|---|---|---|---|
| $r_1$ | 89.288 | $d_1$ 11.82 | $n_1$ | 1.67321 | $v_1$ | 38.25 |
| $r_2$ | 70.202 | $d_2$ 3.76 | | | | |
| $r_3$ | 87.951 | $d_3$ 18.18 | $n_2$ | 1.69312 | $v_2$ | 55.33 |
| $r_4$ | ∞ | $d_4$ 2.64 | | | | |
| $r_5$ | 155.575 | $d_5$ 14.19 | $n_3$ | 1.64058 | $v_3$ | 46.93 |
| $r_6$ | 61.19 | $d_6$ 21.8 | | | | |
| $r_7$ | −52.109 | $d_7$ 10.39 | $n_4$ | 1.6596 | $v_4$ | 35.37 |
| $r_8$ | 2814.075 | $d_8$ 5.19 | | | | |
| $r_9$ | 745.881 | $d_9$ 18.23 | $n_5$ | 1.62731 | $v_5$ | 56.36 |
| $r_{10}$ | −76.778 | $d_{10}$ 0.14 | | | | |
| $r_{11}$ | −528.197 | $d_{11}$ 18.14 | $n_6$ | 1.62799 | $v_6$ | 54.95 |
| $r_{12}$ | −127.861 | $d_{12}$ 5.01 | | | | |
| $r_{13}$ | 799.931 | $d_{13}$ 16.64 | $n_7$ | 1.62731 | $v_7$ | 56.36 |
| $r_{14}$ | ∞ | | | | | |

$f = 236.081$ wherein $S_1$ represents the distance to the surface of the first lens 1 directed toward the stop therefrom, $r_1$, $r_2$, —, $r_{14}$ represents the radii of curvature of the successive lens surfaces, $d_1$, $d_2$, —, $d_{13}$ represents the axial thicknesses and the axial spaces of successive lenses, $n_1$, $n_2$, —, $n_7$ represents the refractive indexes of the individual lenses based upon g-line (435.8m $\mu$), $v_1$, $v_2$, —, $v_7$ represents the Abbe number of individual lenses, f represents the total focal length.

4. An equi-magnification lens perfectly symmetric with respect to a stop, having two lens groups, each of the lens groups consisting of a first lens, a second lens, a third lens, a fourth lens, a fifth lens, a sixth lens and a seventh lens, said first lens being a negative meniscus lens with the convex surface directed toward said stop, said second lens being a positive lens with its convex surface of a small radius of curvature directed toward the stop, said third lens being a negative meniscus lens with its convex surface directed toward said stop, said fourth lens being a negative meniscus lens with its concave surface directed toward said stop, said fifth lens being a positive lens with its convex surface of a small radius of curvature directed away from the stop, said sixth and seventh lenses being both positive lenses, and the lens system having the following numerical data:

TABLE $S_1 = 5.25$

| | | | | | | |
|---|---|---|---|---|---|---|
| $r_1$ | 89.741 | $d_1$ 11.84 | $n_1$ | 1.67321 | $v_1$ | 38.25 |
| $r_2$ | 70.363 | $d_2$ 3.75 | | | | |
| $r_3$ | 88.288 | $d_3$ 18.26 | $n_2$ | 1.69312 | $v_2$ | 55.33 |
| $r_4$ | ∞ | $d_4$ 2.73 | | | | |
| $r_5$ | 156.598 | $d_5$ 14.19 | $n_3$ | 1.64058 | $v_3$ | 46.93 |
| $r_6$ | 61.507 | $d_6$ 21.74 | | | | |
| $r_7$ | −51.959 | $d_7$ 10.09 | $n_4$ | 1.6596 | $v_4$ | 35.37 |
| $r_8$ | 3422.314 | $d_8$ 5.26 | | | | |
| $r_9$ | 779.819 | $d_9$ 17.89 | $n_5$ | 1.62731 | $v_5$ | 56.36 |
| $r_{10}$ | −76.497 | $d_{10}$ 0.14 | | | | |
| $r_{11}$ | −507.938 | $d_{11}$ 18.11 | $n_6$ | 1.63695 | $v_6$ | 53.2 |
| $r_{12}$ | −126.679 | $d_{12}$ 5.03 | | | | |
| $r_{13}$ | 812.955 | $d_{13}$ 16.63 | $n_7$ | 1.62731 | $v_7$ | 56.36 |
| $r_{14}$ | ∞ | | | | | |

$f = 235.921$ wherein $S_1$ represents the distance to the surface of the first lens 1 directed toward the stop therefrom, $r_1$, $r_2$, —, $r_{14}$ represents the radii of curvature of the successive lens surfaces $d_1$, $d_2$, —, $d_{13}$ represents the axial thicknesses and the axial spaces of successive lenses, $n_1$, $n_2$, —, $n_7$ represents the refractive indexes of the individual lenses based upon g-line (435.8m $\mu$), $v_1$, $v_2$, —, $v_7$ represents the Abbe number of individual lenses, f represents the total focal length.

5. An equi-magnification lens perfectly symmetric with respect to a stop, having two lens groups, each of the lens groups consisting of a first lens, a second lens, a third lens, a fourth lens, a fifth lens, a sixth lens and a seventh lens, said first lens being a negative meniscus lens with the convex surface directed toward said stop, said second lens being a positive lens with its convex surface of a small radius of curvature directed toward the stop, said third lens being a negative meniscus lens with its convex surface directed toward said stop, said fourth lens being a negative meniscus lens with its concave surface directed toward said stop, said fifth lens being a positive lens with its convex surface of a small radius of curvature directed away from the stop, said sixth and seventh lenses being both positive lenses, and the lens system having the following numerical data:

TABLE $S_1 = 5.21$

| | | | | | | |
|---|---|---|---|---|---|---|
| $r_1$ | 90.351 | $d_1$ 12.49 | $n_1$ | 1.67321 | $v_1$ | 38.25 |
| $r_2$ | 70.007 | $d_2$ 3.75 | | | | |
| $r_3$ | 89.237 | $d_3$ 18.87 | $n_2$ | 1.69312 | $v_2$ | 55.33 |
| $r_4$ | ∞ | $d_4$ 3.41 | | | | |
| $r_5$ | 159.88 | $d_5$ 14.88 | $n_3$ | 1.64058 | $v_3$ | 46.93 |
| $r_6$ | 61.998 | $d_6$ 22.38 | | | | |
| $r_7$ | −51.412 | $d_7$ 9.4 | $n_4$ | 1.6596 | $v_4$ | 35.37 |
| $r_8$ | ∞ | $d_8$ 5.4 | | | | |
| $r_9$ | 918.473 | $d_9$ 17.2 | $n_5$ | 1.62731 | $v_5$ | 56.36 |
| $r_{10}$ | −74.405 | $d_{10}$ 0.14 | | | | |
| $r_{11}$ | −464.138 | $d_{11}$ 18.06 | $n_6$ | 1.63147 | $v_6$ | 54.0 |
| $r_{12}$ | −125.008 | $d_{12}$ 5.42 | | | | |
| $r_{13}$ | 733.772 | $d_{13}$ 16.93 | $n_7$ | 1.62731 | $v_7$ | 56.36 |
| $r_{14}$ | ∞ | | | | | |

$f = 236.242$ wherein $S_1$ represents the distance to the surface of the first lens 1 directed toward the stop therefrom, $r_1$, $r_2$, —, $r_{14}$ represents the radii of curvature of the successive lens surfaces, $d_1$, $d_2$, —, $d_{13}$ represents the axial thicknesses and the axial spaces of successive lenses, $n_1$, $n_2$, —, $n_7$ represents the refractive indexes of the individual lenses based upon g-line (435.8m $\mu$), $v_1$, $v_2$, —, $v_7$ represents the Abbe number of individual lenses, f represents the total focal length.

* * * * *